United States Patent
Rooms et al.

(10) Patent No.: US 9,104,028 B2
(45) Date of Patent: Aug. 11, 2015

(54) DEFORMABLE MIRROR WITH CAPACITIVE SENSORS

(75) Inventors: Frédéric Christian Robert Rooms, Biviers (FR); Julien Gérard Ernest Charton, Brignoud (FR); Michel Raymond Barrault, Mens (FR)

(73) Assignee: ALPAO, MontBonnot-Saint-Martin (FR)

( * ) Notice: Subject to any disclaimer, the term of this patent is extended or adjusted under 35 U.S.C. 154(b) by 196 days.

(21) Appl. No.: 13/981,654

(22) PCT Filed: Jan. 25, 2012

(86) PCT No.: PCT/FR2012/050165
§ 371 (c)(1),
(2), (4) Date: Nov. 13, 2013

(87) PCT Pub. No.: WO2012/101385
PCT Pub. Date: Aug. 2, 2012

(65) Prior Publication Data
US 2014/0085740 A1    Mar. 27, 2014

(30) Foreign Application Priority Data

Jan. 26, 2011    (FR) ...................................... 11 50618

(51) Int. Cl.
G02B 26/08    (2006.01)
G02B 26/06    (2006.01)

(52) U.S. Cl.
CPC ............ *G02B 26/0825* (2013.01); *G02B 26/06* (2013.01)

(58) Field of Classification Search
CPC ............... G02B 26/0825; G02B 26/06; G02B 26/0841; G02B 27/0068; G02B 26/0833
USPC .......................... 359/846, 849, 212.1–214.1, 359/223.1–226.1
See application file for complete search history.

(56) References Cited

U.S. PATENT DOCUMENTS 5,037,184 A    8/1991    Ealey
5,210,653 A    5/1993    Schell
(Continued)

FOREIGN PATENT DOCUMENTS

EP    0 744 641 A2    11/1996
EP    2 096 482 A2    9/2009
(Continued)

OTHER PUBLICATIONS

International Search Report, mailed Apr. 12, 2012 in connection with PCT International Application No. PCT/FR2012/050165, filed Jan. 25, 2012.
(Continued)

*Primary Examiner* — Euncha Cherry
(74) *Attorney, Agent, or Firm* — John P. White; Cooper & Dunham LLP

(57) ABSTRACT

The invention relates to a deformable mirror (1) comprising a deformable reflector member (2) possessing a reflecting surface (3), at least one actuator (6) suitable for driving said reflector member (2) to move substantially along a deformation direction (XX') so as to be capable of deforming the reflecting surface (3), and at least one position sensor (14) arranged in the interstitial space (12) lying between the reflecting surface (3) and the widest cross-section ($S6_{MAX}$) of the actuator (6), on an intermediate reference support (11), in such a manner as to be capable of evaluating the position of the reflecting surface (3), the sensor (14) occupying a cross-section (S14) transversely to the deformation direction that, in projection along said deformation direction (XX'), presents at least one overlap zone (SR) with the widest cross-section of the actuator ($S6_{MAX}$). Such deformable mirrors are suitable for use in adaptive optics.

27 Claims, 3 Drawing Sheets

(56) References Cited

U.S. PATENT DOCUMENTS 6,293,680 B1    9/2001    Bruns
7,374,302 B2 *   5/2008    Griffith et al. ............... 359/849

FOREIGN PATENT DOCUMENTS

| | | |
|---|---|---|
| FR | 2 813 677 A1 | 3/2002 |
| WO | WO 2010/018326 A1 | 2/2010 |

OTHER PUBLICATIONS

Written Opinion of the International Searching Authority, mailed Apr. 12, 2012 in connection with PCT International Application No. PCT/FR2012/050165, filed Jan. 25, 2012.

Manetti, M. et al. (2010). Experimental validation of a numerical model for non contact, massively actuated, deformable adaptive mirrors. *Proc. SPIE7736, Adaptive Optics Systems II*, 7736, 77363W-1-77363W-12.

* cited by examiner

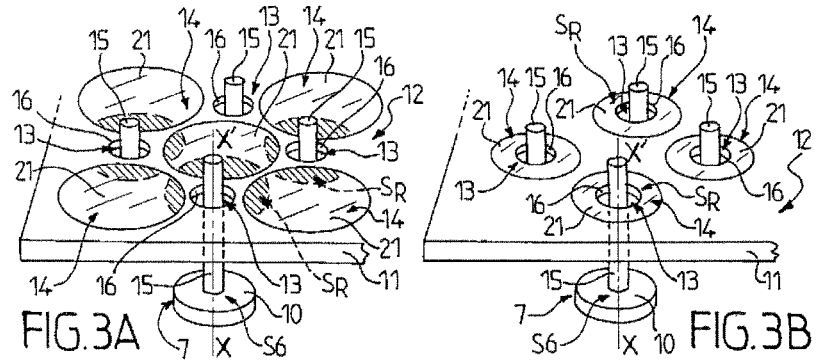
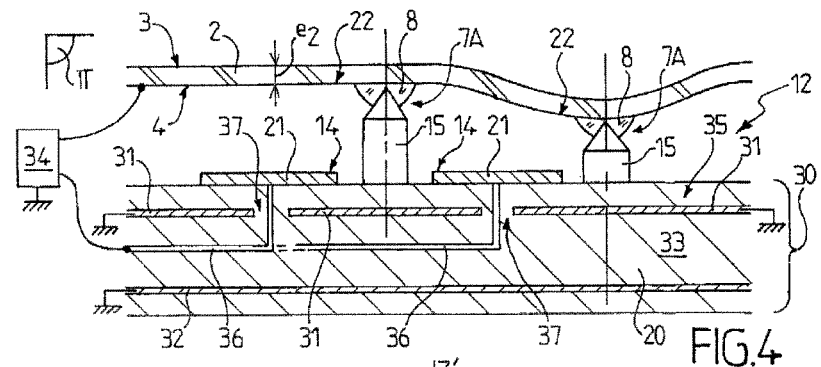
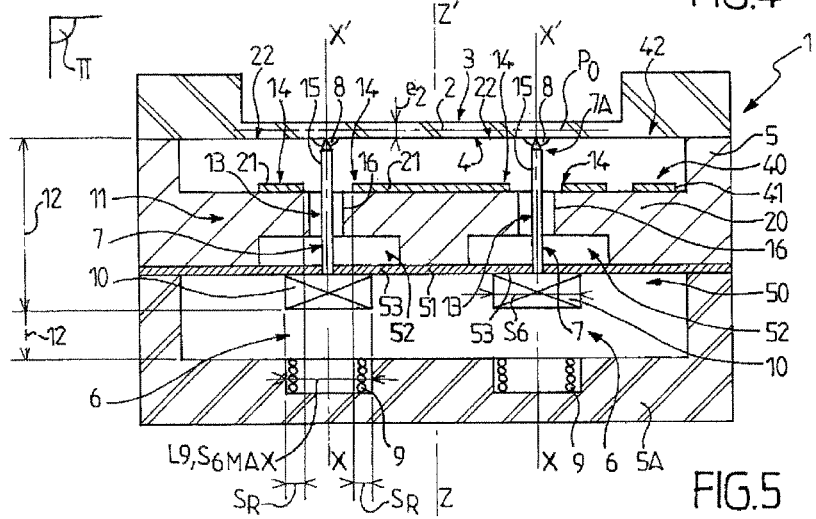

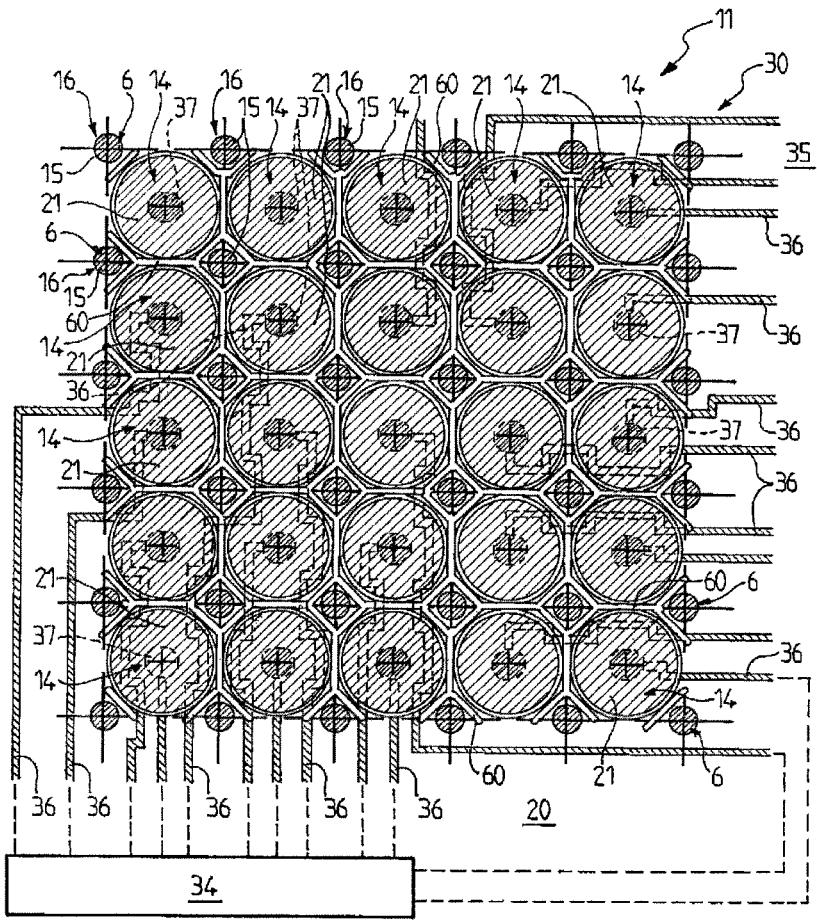
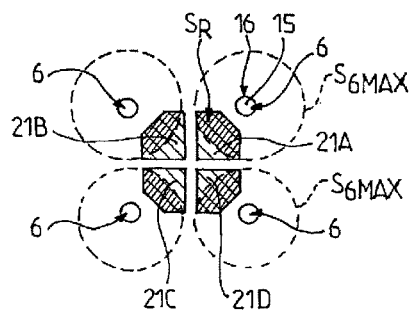
FIG.6
FIG.7

DEFORMABLE MIRROR WITH CAPACITIVE SENSORS

CROSS-REFERENCE TO RELATED APPLICATIONS

This application is a §371 national stage of PCT International Application No. PCT/FR2012/050165, filed Jan. 25, 2012, claiming priority of French Patent Application No. 1150618, filed Jan. 26, 2011, the contents of each of which are hereby incorporated by reference in its entirety.

TECHNICAL FIELD

The present invention relates to the general field of deformable mirrors used in adaptive optical systems for applications that are as diverse as astronomy, medicine, in particular ophthalmology, telecommunications, metrology, etc.

More particularly, the present invention relates to a deformable mirror comprising firstly a deformable reflector member that possesses a reflecting surface and secondly at least one actuator suitable for driving said reflector member in movement substantially along a deformation direction (XX') so as to be capable of deforming the reflecting surface.

PRIOR ART

It is known to use deformable mirrors for the purpose of correcting irregularities in the wavefront of a light beam.

For this purpose, such deformable mirrors are provided with a flexible reflecting surface that is generally formed by a membrane having actuators connected to its back that are suitable for locally moving the membrane forwards or backwards.

It is thus possible to compensate for phase shifts that give rise to deformation of the wavefront by modifying the optical path followed by the various rays making up the beam that is reflected on said membrane.

The actuators may in particular be of electrostatic or electromagnetic type, and for example they may comprise magnet type movable members that are fastened to the membrane and remotely controlled by coils secured to the support on which said membrane is fastened.

Although they undeniably produce results, known deformable mirrors can nevertheless present certain drawbacks.

In particular, it is sometimes difficult to discover, and a fortiori to servo-control, the positions of the various actuators accurately, and consequently the exact profile of the membrane.

Furthermore, it is sometimes difficult to control the dynamic behavior of the mirror and it can sometimes be subjected to oscillations or to a mechanical resonance phenomenon.

These difficulties apply in particular to mirrors of small dimensions, of the micro-mirror type, in which in particular the available volume is very limited, so that it is difficult to integrate a large number of actuators therein, and a fortiori a large number of sensors, which sometimes makes it difficult, if not impossible, to observe and control the profile of the membrane accurately.

The servo-control performance of such a membrane can therefore be relatively limited both in terms of accuracy and in terms of spatial resolution.

In addition, prior art deformable mirrors may be found to be particularly sensitive to thermal or electromagnetic disturbances, and to suffer from drifts that can sometimes be difficult to detect and correct.

The proper operation of such mirrors thus generally depends on periodic calibration, which assumes that service is interrupted and which can also be complex or time consuming to perform, particularly if it involves using templates and/or high accuracy external instruments for observation and measurements.

SUMMARY OF THE INVENTION

Consequently, the objects given to the invention seek to remedy the various above-mentioned drawbacks and to propose a novel deformable mirror that is compact while also being capable of fine servo-control with good resolution and with good accuracy.

Another object given to the invention seeks to propose a novel deformable mirror that presents a structure that is particularly simple, compact, and robust, and that is easy to assemble and inexpensive to manufacture.

Another object given to the invention seeks to propose a deformable mirror that is particularly insensitive to disturbances and in which drifts, if any, can easily be corrected.

Another object given to the invention seeks to propose a novel deformable mirror that presents increased reliability.

Another object given to the invention seeks to propose a novel deformable mirror that presents behavior that is predictable, reproducible, and stable.

Another object given to the invention seeks to propose a novel deformable mirror that possesses a response time that is particularly short, so as to enable the mirror to be particularly reactive.

The objects given to the invention are achieved with the help of a deformable mirror comprising firstly a deformable reflector member that possesses a reflecting surface and secondly at least one actuator suitable for driving said reflector member in movement substantially along a deformation direction (XX') so as to be capable of deforming the reflecting surface, said mirror being characterized in that the actuator presents a cross-section of variable width along said deformation direction (XX'), and in that it includes at least one interstitial position sensor that is arranged in the interstitial space lying between the reflecting surface and the largest cross-section of the actuator, on an intermediate reference support relative to which the reflector member moves when it is driven by said actuator, so as to be able to evaluate the position and/or the movement of said reflecting surface relative to said reference support, said sensor occupying a cross-section transversely to the deformation direction that, in projection along said deformation direction, presents at least one overlap zone with the largest cross-section of the actuator.

BRIEF DESCRIPTION OF THE DRAWINGS

Other objects, characteristics, and advantages of the invention appear in greater detail on reading the following description and from the accompanying figures supplied purely by way of non-limiting illustration, and in which:

FIGS. 3A and 3B are fragmentary diagrammatic views in perspective showing different variants of the arrangement of position sensors within a mirror in accordance with the invention;

FIG. 4 is a fragmentary diagrammatic side view showing the detail of how position sensors are arranged within a mirror in accordance with the invention;

FIG. 5 is a side view in section showing another variant embodiment of a deformable mirror in accordance with the invention;

FIG. 6 is a partially cut-away plan view showing a variant embodiment of a mirror in accordance with the invention having thirty-six actuators with which the intermediate reference support associates twenty-five sensors; and FIG. 7 is a fragmentary diagrammatic plan view showing a variant arrangement of sensors within a mirror in accordance with the invention.

BEST MANNER OF PERFORMING THE INVENTION

The present invention relates to a deformable mirror 1, and more particularly to a deformable mirror 1 for the purpose of modifying, and more particularly for making a wavefront plane in any optical application, e.g. in the fields of astronomy, of medicine, and more particularly of ophthalmology, of telecommunications, of metrology, of spectral analysis, of generating or coupling laser beams, etc. The deformable mirror 1 thus constitutes an adaptive deformable mirror, i.e. a mirror that is active and that is to be used in adaptive optics for the purpose of correcting a wavefront in real time. This implies that the deformable mirror 1 is continuously deformable in reversible manner and therefore does not have a "frozen" shape.

For this purpose, the deformable mirror 1 has a deformable reflector member 2 that possesses a reflecting surface 3 (also referred to as a "reflecting face") for reflecting the incident electromagnetic beam, and more particularly a light beam, and it also has an opposite face, referred to as a "hidden face" 4.

The reflector member 2 is advantageously mounted on a main support 5 so as to be attached to said main support 5, preferably solely via its periphery, thus leaving the reflector member free to move and to deform everywhere else, and in particular at its center.

In a variant that is not shown, the reflector member 2 may be made up of a set of juxtaposed rigid plates that are independent from one another and that are movable or hinged relative to one another, forming facets, which together make up a fragmented reflecting face.

Nevertheless, and preferably, the reflector member 2 is formed by a flexible membrane with the reflecting surface advantageously being continuous. Merely for convenience in description, in the description below, the reflector member 2 is assumed to be constituted by such a membrane.

Figure 1:
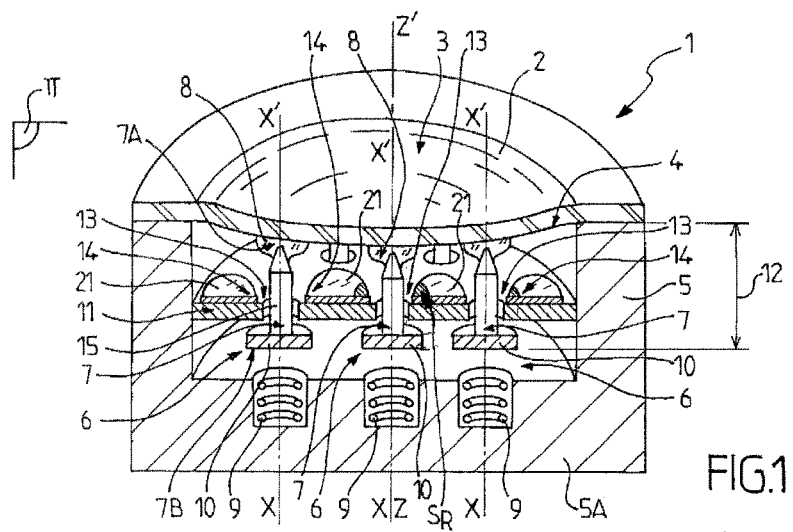
FIG. 1 is a perspective view in section showing a variant embodiment of a deformable mirror in accordance with the invention.
Figure 2:
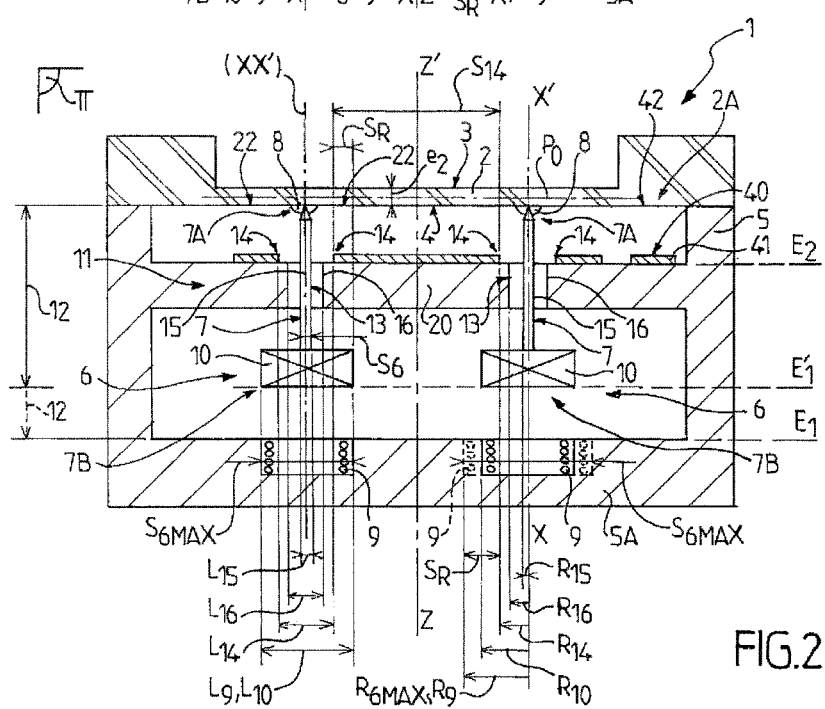
FIG. 2 is a side view in section showing a deformable mirror of a type analogous to that shown in FIG. 1.

The membrane 2 is mounted on a preferably rigid main support 5 that may in particular form a hollow box that is covered by said membrane 2 in its top portion, as shown in FIGS. 1, 2, and 5, and that is referred to below for convenience of description as being a box.

Naturally, both the material constituting the membrane 2 and the thickness $e_2$ of the membrane are selected specifically to ensure that said membrane 2 has the necessary flexibility, while complying with other constructional and functional constraints, e.g. associated with electrical conductivity, mechanical strength, or the resonant frequency of said membrane.

In this respect, said membrane may be made using a polymer film or a fine sheet of silicon, and it may present thickness $e_2$ that is less than or equal to 50 micrometers (μm), preferably less than or equal to 10 μm, or even lying in the range 10 μm to 30 μm.

Furthermore, the thickness $e_2$ of said membrane is preferably substantially constant, such that the reflecting face 3 and the hidden face 4 are substantially parallel, with the thickness being small compared with the other two dimensions in which the membrane extends.

Furthermore, the mean profile $P_0$ of said membrane 2, and more particularly of the reflecting face 3, may be arbitrary.

By way of example, said mean profile $P_0$, when considered at rest in the sagittal plane π of the deformable mirror 1, may be substantially straight, such that the reflecting mirror is substantially plane, as represented by chain-dotted lines in FIGS. 2 and 5.

Said mean profile $P_0$ may also be slightly curved, and preferably regularly curved, so that the reflecting face 3 presents a rounded profile, preferably a concave profile, e.g. in the form of a cup such as a spherical cap, as shown in FIG. 1, or else it may be of the parabolic type.

For convenience in description, it is assumed, as shown in the figures, that the central optical axis (Z-Z') of the mirror 1 extends substantially vertically in a direction that is substantially normal both to the reflecting surface 3 situated at a high level and to the bottom 5A of the box 5 that is situated at a low level.

Furthermore, the outline around the optical axis (Z-Z') that defines the side of the membrane 2 and more particularly of the working reflecting zone 3 of the member 2, and also the sides of the main support 5, may be of arbitrary shape, but it preferably corresponds to a polygon such as a rectangle, and more particularly a regular polygon, such as a square or indeed a circle, the mirror then being substantially in the form of a prism or a cylinder with a generator axis parallel to the optical axis (Z-Z'), as shown in FIGS. 1, 2, and 5. Said optical axis may then advantageously coincide with an axis of revolution of said mirror, or at least an axis about which said mirror is invariant in rotation.

In the invention, the mirror 1 includes at least one actuator 6 suitable for driving said reflector member 2 to move substantially along a deformation direction (XX') so as to be capable of deforming the reflecting surface 3, said deformation direction (XX') preferably being substantially normal to the membrane, and more particularly to the reflecting surface 3, and parallel to the optical axis (Z-Z') of the mirror.

For this purpose, the actuator 6 includes at least one piece of movable equipment 7 that extends between firstly a first end 7A connected to the membrane 2 and secondly an opposite second end 7B that advantageously faces towards the bottom of the box 5A and that is closer to said bottom 5A than is the membrane 2, as can be seen in the figures.

More particularly, the movable equipment 7 and the portion of the reflector member 2 that is attached thereto preferably follow a deformation path that is substantially straight, vertical in this example, and substantially parallel to the general deformation direction (XX'), and is assumed below to be the same as said direction, for convenience in the description.

The mirror 1 preferably has a plurality of actuators 6 that may be of structure and dimensions that are substantially identical from one to another, and it may thus have a corresponding plurality of pieces of movable equipment 7 that are advantageously independent from one another and each of which is connected individually to the deformable membrane 2.

The connections between the pieces of movable equipment 7 and the membrane 2 may be of various kinds, however said connections are preferably implemented by a layer of adhesive 8, preferably using an elastomer adhesive.

Such junctions made by adhesive may advantageously connect the "proximal" first end of each actuator and more particularly the proximal first end 7A of each piece of movable equipment directly to the hidden face 4 of the membrane 2.

The junctions may be either in the form of a substantially continuous layer shared between a plurality of actuators 6 and distributed substantially uniformly over most if not all of the hidden face 4, or else, and preferably, they may be in the form of separate spots of adhesive, each first end 7A then being fastened directly and individually to the hidden face 4 substantially at a point by a drop of adhesive.

Advantageously, individually fitting each piece of movable equipment at a point makes it possible to limit the amount of adhesive that is used, to reduce degassing phenomena that might otherwise be observed when the mirror is used in an application at low pressure, e.g. within a cryostat, and also to simplify replacement of a defective actuator, should that be necessary. Using spots of adhesive also makes it possible to avoid adding an extra layer on the hidden face, thereby in particular preserving the mechanical properties of the membrane 2 and avoiding making it excessively stiff or heavy, and consequently significantly lowering its resonant frequency, and also improving the thermal qualities of said membrane (dissipation, expansion, uniformity of behavior, avoiding the bimetallic strip effect).

Furthermore, although the adhesively-bonded proximal ends of the piece of movable equipment may be of any shape, and in particular may be flat, they are preferably substantially pointed in shape, as shown in the figures, and in particular substantially conical or frustoconical, possibly being blunted, tapering upwards towards the membrane 2 so as to limit the footprint of the adhesive and thus avoid excessively embossing the reflective face 3 by construction.

Furthermore, and preferably, the actuators 6 are distributed within the outline defined by the membrane around the central axis (Z-Z'), and more particularly they are housed inside the box 5 at the nodes of a regular-mesh array, e.g. an array of meshes that are substantially square, rhombic, or hexagonal, such that said actuators 6, and more particularly the associated pieces of movable equipment 7, engage the membrane 2 in a crisscross pattern, thus subdividing it into a kind of matrix in which it is advantageously possible to control locally the movement of each cell individually.

By way of example, a mirror having its membrane 2 with a diameter of about 15 millimeters (mm) may have fifty-two actuators 6, preferably spaced apart from one another at a pitch of about 1.5 mm to 3 mm.

Advantageously, each actuator 6 has a base member 9 relative to which the piece of movable equipment moves and that preferably forms an activation member capable of driving and controlling the movement of the associated piece of movable equipment 7 and of keeping it in position. Furthermore, said base member 9, which for convenience is referred to below as an activation member 9, is advantageously secured to the main support 5, and preferably to the bottom of the box 5A in which it may advantageously be embedded.

In this context, it is remarkable that the invention is not limited in any way to any particular type of actuator 6, and in particular for the purpose of driving and controlling the movement of the movable equipment 7 and consequently causing the membrane 2 to be spaced further away from or to come closer to the bottom 5A of the box, may make use in particular of any type of technology capable of giving rise to movement, deformation, or expansion, e.g. of origin that is mechanical, electrical, electromagnetic, electrostatic, piezoelectric, pneumatic, hydraulic, thermal, etc.

In a variant embodiment that is not shown, one or more of the actuators 6 may be formed by piezoelectric columns, which may for example extend between the bottom 5A of the box on which they are fastened and against which they bear, and the hidden face 5 of the membrane 2, with each piece of movable equipment 7 then being formed by the body of said column that is capable of lengthening or shortening depending on the control voltage that is applied thereto.

In another variant embodiment that is not shown, the activation member 9 and the corresponding piece of movable equipment 7 may comprise electrodes forming the plates of an electrostatic actuator.

Nevertheless, in a preferred variant embodiment that corresponds to the figures, the actuators 6 are of the electromagnetic type.

The activation member 9 may then be of the induction coil type serving to control the magnitude and the polarity of a magnetic field that it applies to the movable equipment 7, with the movable equipment comprising a driver core 10 that may be constituted by one or more permanent magnets.

Said core is preferably in the form of a disk arranged at the end 7B of said piece of movable equipment 7, facing the activation member 9.

Advantageously, such a solution makes it possible to benefit from a working stroke of large amplitude, in particular of the order of 10 µm to 40 µm, or even more, and also to benefit from bidirectional control since the permanent magnet 10 may either be attracted (creating a depression in the reflecting surface), or else repelled (forming a bulge) by the coil 9, depending on the polarity of the magnetic field it creates.

According to an important characteristic of the invention, the actuator 6, and preferably its piece of movable equipment 7, presents a cross-section S6 of width that varies along the deformation direction (XX'), and the mirror 1 has at least one interstitial position sensor 14 that is arranged in the interstitial space 12 that lies between the reflecting surface 3 and the widest cross-section $S6_{MAX}$ of the actuator 6, and/or more particularly the widest cross-section of its movable equipment 7, on an intermediate reference support 11 relative to which the reflector member 2 moves when it is driven by said actuator, so as to be capable of evaluating the position and/or the movement of said reflecting surface 3 relative to said reference support 11. Thus, said position sensor 14 extends from said reference support 11 towards the reflector member 2 and preferably all the way thereto. The intermediate reference support 11 thus provides a stable reference point for the measurements made by the position sensor 14, and for this purpose it is advantageously stationary relative to the main support 5. Said actuator 6 is preferably designed to move relative to said reference support 11 so the reference support is therefore distinct from said actuator 6. In addition, said sensor 14 occupies a cross-section S14 transversely to the deformation direction that presents, in projection along said deformation direction (XX'), at least one overlap zone SR with the widest cross-section of the actuator $S6_{MAX}$.

In other words, the sensors 14 are advantageously arranged at a different level from the actuators 6 while simultaneously overlapping them transversely, horizontally in this example, by offsetting and more particularly by sharing the bulkiest portions of those respective elements on at least two distinct levels E1 and E2 along the deformation direction (XX').

Naturally, the sensors 14 may act directly or indirectly to detect position, change of position, or indeed travel speed of the portion of the reflector member 2, and more generally of the reflecting surface, that is controlled by the actuator(s) in the detection zones covered by said sensors.

Advantageously, said actuator 6 is secured to a support 5A that is arranged under the reference support 11 and at a distance therefrom, in such a manner that said reference support 11 is interposed between the reflector member 2 and said support 5A. Preferably, said actuator 6 thus extends not only over the reference support 11, between it and the reflector member 2, but also under the reference support 11, between the support 5A and the reference support 11. The support 5A is preferably stationary relative to the reference support 11. In particularly preferred manner, said support 5A is formed by the main support 5, and when the main support 5 is formed by a box, the support 5A is more particularly by the bottom 5A of the box.

Such a staged arrangement presents numerous advantages.

Firstly, it makes it possible for the position sensor 14 to be brought closer to the deformation path (XX') and thus to determine the position and the movements of the membrane 2 substantially in register with the actuator 6, and more particularly with its movable equipment 7, very close to the deformation path (XX') and thus very close to the zone of the membrane that is subjected to the greatest deformation.

The mirror in accordance with the invention can thus be servo-controlled very accurately and very finely via each actuator 6, thereby increasing its level of performance and its reliability.

In addition, according to a characteristic that can constitute an invention on its own, it makes it possible to arrange the position sensors 14 on a reference support 11 in an interstitial space 12 that may possibly be defined as being the portion of the space that lies between the proximal and distal ends 7A and 7B of each piece of movable equipment, regardless of the way the movable equipment 7 is arranged relative to the actuators 6 as a whole, i.e. in a volume that is usually left unused within prior art mirrors, thus making it possible for the mirror to be made more compact.

Furthermore, the resulting proximity between the membrane 2 and the sensors makes it possible to improve the gain, the accuracy, and the reliability of the measurements, in particular by increasing the working area of the sensors 14 and/or the density per unit area with which said sensors are distributed under the membrane.

Advantageously, this location within the interstitial space 12 also has a volume that is sufficiently unencumbered, in particular in the vertical direction corresponding to the deformation path (XX') to make it possible, where necessary, to install a reference support 11 that is particularly thick and very rigid, that is secured to the box 5, and that is thus capable of providing a reference point that is particularly stable and reliable for the measurements, while also reserving a large amount of volume that is available for passing the connections with the sensors 14.

Furthermore, the arrangement in accordance with the invention advantageously makes it possible for the sensor 14 to be brought very close to the path (XX') of the actuator 6 with which it is associated, to such an extent that at least a portion of said sensor interferes with (overlaps) the volume corresponding to the geometrical cylinder of axis corresponding to the deformation path (XX') within which the actuator 6 is located (said geometrical cylinder preferably being generated by the largest base surface $S6_{MAX}$ of the sensor when it sweeps a generator line carried by said deformation path (XX')).

It is thus possible either to have the sensors in a tighter distribution, increasing, for a given area of membrane, the total working density per unit area of the sensors contributing to measuring the position and/or movement of the membrane, and/or to increase the number of independent sensors by distributing them at a small pitch and consequently refining the resolution of the measurement by increasing the number of measurement points for a given area.

Furthermore, the sensors 14 do not interfere in any way with positioning the actuators 6 (and vice versa), with the greater packing density and miniaturization of the sensors that is made possible by the arrangement in accordance with the invention also making it possible to limit or indeed reduce the pitch between an actuator 6, and more particularly its movable equipment 7, and an adjacent actuator 6, and more particularly its movable equipment 7.

In addition, using a large number of actuators 6 and/or of actuators occupying a large area does not have the consequence of making it impossible to use a large number of sensors 14 and/or of sensors, themselves occupying large areas, because the sensors are located at a different level.

In particular, the total surface area made up of the maximum cross-sections $S6_{MAX}$ of the actuators 6, or of the pieces of movable equipment 7, as considered in a horizontal first level E1, E1' that is substantially normal to the deformation direction (XX') and in which the corresponding portions of the actuators are located, plus the maximum cross-section S14 of the sensors 14, and in particular the areas used for detection purposes, considered at the second level E2 that they occupy, can be greater than the unit area available at each of the levels under the membrane 2.

In other words, spreading the components of the mirror 1 vertically serves to increase the filling density at each of the levels, and in particular at the first level E1, E1', which is "filled" with the actuators and/or the second level E2, which is "filled" with the sensors 14, up to or exceeding 50% or even 75%, so that the combined total occupation of area then exceeds 100% of a single level (i.e. the projected surface area occupied by the sensors 14, for example, represents at least 50% or even 75% of the total surface area available under the reflector member).

The invention thus also relates as such to a mirror arranged so as to have a first level E1 carrying a first array of actuators 6 and more particularly of stationary base members 9, and a second level E2 distinct from the first and carrying a second array of sensors 14, with the area occupied by the second array at the second level (the upper left in this case) being greater than the area level left empty by the first array at the first level.

By being able to increase the density of the actuators 6 per unit area, and more particularly per horizontal unit area, it is possible to achieve better control over the deformation of the membrane, while conserving the possibility of monitoring this deformation by means of sensors arranged substantially level with and/or between the various pieces of movable equipment 7, it being suitable for there to be a large number of sensors 14 even though each of them presents a working area that can be relatively large, thereby giving them gain, accuracy, and sensitivity that are particularly high.

Finally, the arrangement in accordance with the invention advantageously makes it possible to provide a mirror that has a structure that is compact, that is not bulky, and that is nevertheless relatively simple and inexpensive to fabricate.

Preferably, and as shown in the figures, the driver core 10 in each piece of movable equipment 7 is connected to the reflector member 2 by a spacer 15 such as an offset rod 15, that presents an overall width $L_{15}$ that is less than the overall width $L_{10}$ of the core 10, where the overall width $L_{10}$ may indeed be substantially equal to or less than the overall width of the activation member 9.

In other words, the movable equipment 7 in accordance with the invention preferably itself presents variation in its cross-section, thereby producing a structure that is staged vertically between the membrane 2 and the bottom of the box 5A along the deformation path (XX'), and more generally along the optical axis (Z-Z'), said staged structure including at least a narrow top segment, specifically formed by the rod 15, of cross-section that is smaller than that of a wide bottom segment, here formed by the core 10, presenting outlines that are radially further from the deformation path (XX') than the outlines of the rods 15.

Interstitial space is thus advantageously made available within the mirror under the membrane 2, above the magnets 10, and around each of the rods 15 for receiving the reference support 11 and the sensors 14, the sensors and the reference support occupying the space thus left available by the movable equipment without it being necessary to reduce the width of the magnet core 10.

The rod 15 thus preferably forms a constriction 13 that may advantageously be located in a passage 16 formed through the reference support 11, said passage itself being wider than the spacer 15 and narrower than the core 10, such that the position sensor 14 carried by the reference support in the vicinity of the passage 16 is situated at least in part over said core 10, its cross-section S14 "overlapping" the space situated above said core 10.

The passage 16 is advantageously wider than said rod so that the rod can move freely back-and-forth through the reference support 11, however it should be narrower than the core 10, i.e. it should be radially closer to the deformation path (XX') than is the outline of said core 10, such that the sensor 14 is situated at least in part over said core 10.

Thus, and preferably, the radial distances from the deformation path (XX') respectively of the rod 15, the passage 16, the rim of the position sensor 14 closest to said deformation path (XX'), and finally the core 10, when these elements all belong to the same subassembly situated in register with a given actuator 6, and more particularly the respective widths $L_{15}$, $L_{16}$, $L_{14}$, and $L_{10}$ thereof, increase in that order, as can be seen in particular in FIG. 2: $L_{15}<L_{16}<L_{14}<L_{10}$, it being assumed that the elements define contours that surround said path (XX'), and in particular that are closed or indeed circular.

Advantageously, such an arrangement also makes it possible to conserve a core 10 that is relatively large and massive, that is relatively easy to manipulate and assemble, and that enables a large amount of force to be exerted in accurate quantities on the movable equipment 7 and the membrane 2, while nevertheless conserving the accuracy and the reliability of the position measured substantially where the deformation presents its greatest amplitude.

Preferably, the offset rod 15 is made of a material that is substantially rigid, and more particularly substantially inextensible and incompressible in the direction of the deformation path (XX'), such as a composite pin made of carbon fiber, of glass fiber, or of a metal material, so as to form a spacer that withstands traction (pulling) and buckling (folding) and enables the core 10 to be suspended freely and preferably directly from the hidden face 4 of the membrane 2.

Nevertheless, it is remarkable that the presence of numerous sensors 14 advantageously makes it possible, where necessary, to correct the defects of the actuators 6, and in particular to detect possible variations in the base lengths of the rods and to compensate by appropriately moving the movable equipment 7.

Furthermore, it should be understood that in general terms, the principle of overlap SR between a sensor 14 and the associated actuator 6 may be considered relative to the largest cross-section of the actuator 6 in question as a whole, and also with respect to the largest cross-section of the base member 9 considered individually (coil), and/or indeed with respect to the largest cross-section of the piece of movable equipment 7 considered individually.

In particular, depending on whether the largest portion of the actuator is situated in the base member 9 or in the movable equipment 7, the largest cross-section $S6_{MAX}$ of the actuator 6 may correspond either to the cross-section of said base member 9 of width $L_9$, with the first level E1 being situated substantially at the bottom of the box, or else on the contrary to the largest cross-section of the movable equipment, and more particularly of the core 10, the first level E1' then being situated (by convention) at the altitude of said core 10.

In practice, the coils 9 are frequently larger than the magnets 10, as shown in dashed lines in the right-hand portion of FIG. 2, the sensor 14 then being positioned so as to overlap either only the coil 9 or both the magnet 10 and the coil 9.

In other words, and preferably with reference to FIG. 2, the distances from the deformation path (XX') of the various elements as measured along one and preferably two distinct directions extending transversely to said deformation path (XX'), or where appropriate the widths and/or the corresponding areas, may be ordered as follows: $R_{15}<R_{16} \leq R_{14}<R_{10}<R_9$ (or respectively $L_{15}<L_{16} \leq L_{14}<L_{10}<L_9$, where preferably $L_i=2 \times R_i$), the sensor 14 firstly leaving empty the space lying radially between the deformation path (XX') and its rim situated at the distance $R_{14}$ from said path, and then its section 214 extending transversely both over the magnet 10 and over the coil 9, which cover respective circular zones in this example between the deformation path (XX') and their outermost rims situated at respective distances $R_{10}$ and $R_9$ from said path (the overlap zone SR in this example thus extending between $R_{14}$ and $R_9$). Alternatively, said distances and/or areas may be ordered as follows: $R_{15}<R_{16} \leq R_{10}<R_{14}<R_9$, the section S14 of the sensor 14 then covering the outer edge of the coil 9 but not its center, and not the magnet 10, the space situated directly over said magnet 10 being completely empty of any sensor.

Conversely, if the coil 9 is narrower or of the same width as the magnet 10, it is possible to have the following: $R_{15}<R_{16} \leq R_{14}<R_9 \leq R_{10}$, with the overlap zone SR extending between $R_{14}$ (radially inner limit from and beyond which the section S14 occupied by the sensor extends) and $R_{10}$ (radially outer limit of the section occupied by the magnet); or indeed: $R_{15}<R_{16}<R_{10}<R_{14}<R_9$, the sensor then overlapping the magnet 10 in part but not overlapping the coil 10 "inwards", i.e. centripetally towards the path (XX').

Nevertheless, under all circumstances $R_{14}<R_{6MAX}$ where $R_{6MAX}=\text{MAX}(R_9, R_{10})$.

The mirror preferably has a plurality of actuators 6, each presenting at least one piece of movable equipment 7, and preferably each presenting a single piece of movable equipment 7, together with a plurality of position sensors 14 that are carried by a reference support 11 that is common to said sensors and/or to said pieces of movable equipment 7.

Preferably, each piece of movable equipment 7 presents a constriction 13 that is engaged through a distinct passage 16, with at least one position sensor 14 being placed in the vicinity thereof or indeed around it.

In general, the arrangement of each sensor 6, of each piece of movable equipment 7, and the corresponding organization of the mirror and in particular of the reference support 11 can be deduced from one another, mutatis mutandis.

In particular, the actuators 6, the pieces of movable equipment 7, and in particular the rod 15 and the core 10 may be respectively mutually identical and/or at least made of standard elements that are identical to one another, thereby limiting manufacturing costs, simplifying assembly, and, where necessary, making it easier to replace any part that needs replacing during a maintenance operation.

The reference support 11 is preferably formed by a plate 20 that is substantially rigid and plane and that is pierced by one or more through passages 16 that are preferably cylindrical and that enable the movable equipment 7 of the actuator(s) 6 to pass through said plate.

The reference support 11 is thus advantageously interposed between firstly the proximal first end 7A of the rod 15 and the membrane 2, and secondly the distal second end 7B and the core 10, which advantageously remain separated by the plate 20, lying on respective different sides thereof.

Where appropriate, the reference support 11, and more particularly the plate 20, may be made integrally with all or part of the box 5. Nevertheless, in order to provide the mirror with a modular design that facilitates assembly and maintenance operations, said reference support 11 should preferably be formed by a distinct plate that is fitted on and fastened to said box 5, the first level E1 carrying the coils and the second level E2 carrying the sensors 14 being formed by subassemblies that are distinct and stacked one on the other.

Advantageously, the plate 20 may extend in substantially horizontal manner normal to the optical axis (Z-Z') of the mirror, and/or substantially parallel to the hidden face 4 of the membrane 2.

Advantageously, the area distribution of the passages 16 reproduces the array and spacing pitch of the actuators 6.

Naturally, the nature of the position sensor 14 that makes it possible, directly or indirectly, to obtain information about the distance between the membrane 2 and more particularly its hidden face 4 and the reference support 11, and more particularly the top surface of said support, is not restricted to any particular technology.

The sensor 14 may in particular be formed by a sensor that is inductive, resistive, piezoelectric, or indeed by a feeler, or even by an optical sensor, e.g. using a laser beam.

Nevertheless, in particularly preferred manner, the sensor 14 is a capacitive sensor that has a first plate 21 that is stationary in this embodiment and that is arranged on the intermediate support 11 facing the reflector member 2, and a second plate 22 that is a moving plate in this example, that is fastened to the membrane 2, substantially vertically over the first plate 21.

Advantageously, by applying a known alternating voltage to said plates 21, 22, it is possible to measure the capacitance of the sensor at a given instant and thus to determine the distance or the variation in the distance between the two plates, and consequently the distance of the membrane 2 and thus of its reflecting surface 3 from the reference support 11.

Such a configuration makes it possible to simplify greatly the design of the sensor and consequently of the mirror, while guaranteeing that the assembly is compact, simple, reliable, and robust.

Preferably, the or each first plate 21 of the position sensor(s) 14 is formed by an electrode that is substantially plane and that is arranged, preferably flat, on the free surface of the reference support 11, here its top surface, directly facing the reflector member 2, and more particularly its hidden face 4.

Advantageously, the arrangement in accordance with the invention makes it possible to have a dielectric gap between the plates 21 and 22 that is completely empty and unencumbered, this gap preferably being filled merely with air.

Thus, no solid body constitutes a screen between the deformed member (the membrane carrying the second plate) and the sensor 14 (and more particularly the first plate 21), nor does any solid body disturb the conditions that exist in said gap.

In particular, directly between the plates there is no solid element such as a portion of the actuator 6 or a layer of adhesive that presents electrical properties (and in particular relative permittivity $\in_R$) that are very sensitive to humidity and/or to temperature.

Thus, the variations in the capacitance of the sensor 14 remain essentially, and possibly exclusively, caused by the physical movement of the membrane 2 and not by other fluctuations in the impedance of the sensors 14 associated with changes in their environment, thereby guaranteeing that measurement is stable and reproducible, in particular in the face of variations in ambient humidity or temperature.

Above all, the plates 21 and 22 may thus present a large working area and they may be spaced apart by a short distance, e.g. of the order of 100 μm.

It is thus possible, structurally, to confer relatively high capacitance to the sensors 14 given the dimensions of the mirror and the space available for making said sensors 14, it being possible for said capacitance to be less than 1 picofarad (pF) or indeed less than 0.1 pF, and for it to lie in particular, substantially in the range 0.04 pF or 0.05 pF to 0.5 pF.

The second plate 22 may optionally be formed or fitted as extra thickness on the main flexible sheet constituting the membrane 2, e.g. by a deposition, coating, or adhesive-bonding operation.

In a variant embodiment, the second plate may be formed by the deposit that forms the optically reflecting coating of the reflecting top surface 3, and may advantageously be common to the various sensors.

In another variant embodiment, the second plate 22 is preferably formed by the membrane 2 itself, and is shared by some or indeed all of the sensors.

It is possible to make said membrane 2 out of a material that is both flexible and conductive, e.g. using a sheet of doped silicon, so as to make the second plate 22 directly and integrally with the flexible membrane, without there being any need to fit a second plate as extra thickness on said membrane.

Advantageously, it is thus possible to envisage all of the second plates 22 of all of the sensors 14 being formed by a single common electrode constituted by the membrane 2, while the first plates 21 of each of said sensors are separated and electrically insulated from one another.

Naturally, the shape of the plates 21, 22 is not limiting in any way, and by way of example the shape may be circular, polygonal, square, hexagonal, etc. Said shape may be selected in particular for the purpose of optimizing the occupation, and more particularly the filling ratio, of the area available in sensor level E2.

In a variant embodiment shown in particular in FIG. 3A and in FIG. 6, the position sensors 14, and more particularly their respective first plates 21, may be arranged in a configuration that is staggered relative to the actuators 6.

In such a variant embodiment, the first plates may be in the form of pellets, preferably substantially circular flat pellets, and they are preferably arranged in substantially tangential and contiguous manner between the edges of a plurality of neighboring passages 16, somewhat like a face-centered cubic lattice.

More generally, the passages 16, and thus the actuators 6 and the rods 15, may occupy the nodes of an array, e.g. a square array comprising six rows and six columns in FIG. 6, and advantageously presenting a pitch that is substantially constant, whereas each of the meshes, there being twenty-five of them in this example, is occupied by a respective sensor, and preferably by a single plate substantially in the center of said mesh, and at equal distances from the neighboring actuators.

In another variant embodiment, the first plates 21 may be superposed over the actuators, where appropriate at the same pitch as the actuators, and they may preferably be hollowed out, e.g. substantially in their centers, so as to substantially surround an actuator 6 passing therethrough.

More particularly, and as shown in FIG. 3B, the first plate 21 may be formed by annular pellets having hollow centers that cover the surface of the intermediate reference support 11 starting from the rims defining the passages 16 and extending in a radial direction going away from the deformation path (XX').

In other words, the rods may advantageously be surrounded by respective annular plates arranged substantially coaxially thereabout.

Whatever the configuration, the mirror and more particularly the top surface of the reference support and the hidden face 4 of the membrane present a kind of tiling with alternating actuation zones (passage 16, junction points 8 with the rods) and measurement zones (plates 21, 22).

Furthermore, whatever the configuration, the second plate(s) 22 may either be formed by a common plate constituted by the membrane 2 or may be formed by pellets fastened to the hidden face 4 and presenting shapes and dimensions that are substantially a reflection of the shapes and dimensions of the first plates 21.

Naturally, it is possible for the various plates to present shapes and dimensions that vary from one sensor 14 to another, or that differ depending on whether a first plate on the reference support 11 is concerned or whether on the contrary it is a second plate 22 on the membrane 2 that is concerned.

Furthermore, and according to a characteristic that can constitute an invention on its own, the mirror 1 may advantageously have a plurality of actuators 6 in a first array and sensors 14 in a second array in which the spatial density (number of independent sensor units per unit length or area), the shape, and/or the pitch is/are distinct from, and in particular greater than or less than, the corresponding features of the first array of actuators 6, with the distribution of the sensors 14 not necessarily being correlated in systematic manner with the distribution of the actuators 6.

In particular, the respective repetition pitches of the sensors 14 and of the actuators 6 may be constant or varying, and may be less than or on the contrary greater than the pitch of the array of actuators 6 or of sensors 14, respectively, the sensors 14 being closer together or on the contrary further apart than are the actuators 6, and/or the array of sensors 14 being in numbers of units either "tighter", i.e. more dense, or on the contrary "looser" than said actuators.

Thus, and by way of example, a plurality of sensors 14 may be associated with each actuator 6, i.e. there may be more sensors 14 than there are actuators 6 per given area.

As shown in FIG. 7, in this context it is possible to envisage subdividing the sensors 14 so as to increase the number of measurement points per unit area in register with the reflecting surface 3, in order to improve accuracy.

In particularly advantageous manner, such a configuration makes it possible to improve the sampling density per unit area of measurements of the deformation of the reflecting surface, and consequently to reconstitute said deformation more accurately. In particular, by analogy with Shannon's law concerning sampling a periodic signal, the spatial frequency of the sensors 14 in one and/or both of the directions extending transversely to the deformation path (XX') may be at least twice the spatial frequency of the actuators 6.

Where appropriate, it is possible to provide a plurality of sensors in each mesh between adjacent actuators 6, so as to constitute a plurality of sub-meshes, each of which is covered by a respective sensor 14.

For example, and as shown in FIG. 7, each square mesh may be subdivided into four equal quadrants, each of which is covered by a respective plane plate 21A, 21B, 21C, 21D that is electrically insulated from its neighbors, so as to obtain particularly fine tiling of the array by the sensors. In such a configuration, the sensor 14 in each quadrant advantageously presents an overlap zone SR with the actuator 6 that occupies the vertex (node) to which it is closest. When applied to a variant analogous to that of FIG. 6, such a configuration makes it possible to obtain 100 sensors for 36 actuators.

Advantageously, such a configuration makes it possible in particular to detect the a priori undesirable potential formation of an egg-box shape, i.e. a regular succession of depressions and bulges alternating at exactly the spatial period of the array of actuators 6. This kind of embossing could be perceived wrongly, as being a perfectly flat state in the situation in which, with only one sensor located in the center of each mesh, each sensor would average out the alternation overlying said mesh (i.e. the half-bulge from a first actuator followed by a half-depression leading to the neighboring actuator) in order to deliver a zero signal.

Nevertheless, it is remarkable that such a configuration can also be detected with the help of a structure that is simpler and therefore less expensive, making use of sensors 14 that are arranged substantially coaxially with the actuators 6, as shown in FIG. 3B.

Contrary to that which is envisaged above, it is thus also possible to envisage reducing the number and the density of sensors 14 for reasons of expense or to speed up the processing of the information measured by the sensors.

Naturally, the signals picked up by the sensors may be conveyed by cabling elements 36, 37 to an electronic measurement and analysis circuit 34 that serves in turn to evaluate the distance between the membrane 2, and more particularly its reflecting surface 3, and the reference support 11, and/or the movements and/or the speeds of each of the pieces of movable equipment 7 and/or of the membrane 2 or of its reflecting surface 3 in register with said pieces of movable equipment.

Preferably, and according to a characteristic that can constitute an invention on its own, the cabling elements 36, 37 serving to connect the sensor(s) 14 to the remote measurement circuit 34 are housed in the interstitial space 12 and more particularly they run for the most part if not completely substantially horizontally from the respective sensors, and in particular from the center of the level in question, to the periphery of the mirror where they may lead to a set of terminals or to any other connector device.

Such an arrangement advantageously makes it possible to conserve a multitude of processing channels that are separate and decoupled, ideally each being dedicated to a single sensor, thereby improving the reliability and the accuracy with which measurements are acquired.

For this purpose, and according to a preferred characteristic that can constitute an invention on its own, and also regardless of the way in which the reference support 11 is arranged or the sensors 14 are placed relative to the various actuators 6, the reference support 11 has a multilayer structure 30, and may in particular form a coherent multilayer subassembly that is distinct from the box and that is fitted inside the box, in the manner of a printed circuit card.

The multilayer structure 30 preferably has at least one layer of conductive cabling with a plurality of separate cabling tracks 36 formed therein that are connected to the sensors 14. Preferably, all of the tracks 36 are situated substantially horizontally in a common plane normal to the deformation direction (XX') within a single common layer, thus providing greater compactness, lower manufacturing costs, and avoiding parasitic coupling between channels, by avoiding any crossings between the tracks.

When necessary, the tracks 36 may follow sinuous paths, as shown in FIG. 6, so that they extend substantially parallel to one another going towards a common side edge of the mirror while avoiding the obstacles that are formed by the passages 16 or by the other tracks.

The multilayer structure 30 preferably possesses a first protective screen 31, specifically facing towards the membrane 2, and a second protective screen 32, that is spaced apart from the first and that faces in the opposite direction, specifically towards the bottom 5A of the box, such that said protective screens 31 and 32 define between them a protected tunnel 33 capable in particular of receiving the cabling of the position sensor(s) 14, and as shown in FIG. 4.

Preferably, the protective screens 31 and 32 are electrically conductive so as to form electromagnetic shielding, receiving some or all of the cabling for the sensors, and in particular the tracks 36 that may extend within said tunnel.

Thus, by connecting the screens 31 and 32 to ground, it is possible advantageously to isolate the tunnel 33 from electromagnetic disturbances, and thus preserve the measurement signals, even if they are very weak.

The signals from the sensors 14 thus travel along said tunnel 33 in order to reach the electronic measurement and analysis circuit 34, which in turn serves to evaluate the distance between the membrane 2 and the reference support 11, and/or the movements of each of the pieces of movable equipment 7 and/or of the membrane 2 in register with said pieces of movable equipment.

Using a structure that is particularly compact and of small size, it is thus easy to obtain an excellent signal-to-noise ratio, thereby enabling the measurement and acquisition system to be made more accurate.

Furthermore, in particular by virtue of their thickness and the nature of the material from which they are made, it is preferable for the protection screens 31 and 32 also to form or to be associated with other layers so as to constitute elements that provide thermal and/or acoustic protection, and that are capable, where appropriate, either of protecting the measurement signals from the sensors 14 and passing via the tunnel 33, or else, where necessary, of mutually isolating the various levels within the mirror and thus protecting the plates 21 of the sensors 14 and/or the membrane 2 from possible thermal or magnetic interference that might be generated by the electromagnetic activation members 9.

Furthermore, and as shown in FIG. 4, the first protection screen 31 is preferably covered on its side situated towards the membrane 2 in an electrically insulating (dielectric) layer 35 having its free surface (top surface in this example) carrying one or more substantially plane conductive pads that form the (first) capacitor plate(s) 21 of the sensor(s) 14.

The tracks 36 may come to the surface at the backs of the plates 21 from which they extend into the reference support 11 by passing successively through the top insulating layer 35 and then the first protection screen 31 via vertical metal-plates holes known as "vias" 37 that are preferably situated centrally under the plates 21, with the tracks thereafter extending transversely to the periphery of the support 11 and more particularly to the side wall of the box 5 lying substantially under the peripheral outline of the membrane 2, where a connector enables the measurement circuit 34 to be connected thereto.

According to a particularly preferred characteristic that can constitute an invention on its own, the reference support 11 may be formed by a printed circuit card.

This type of circuit makes it possible, among other things, to make the first plates 21 by using conductive pellets that are fabricated using methods that are inexpensive and thoroughly mastered, such as photolithography and electroplating, while the protection screens may be formed by substantially continuous plane conductive layers that are intimately incorporated in the multilayer structure 30, while the tracks 36 may be made in particularly fine and accurate manner by using strips of copper.

Advantageously, such a solution makes it possible to benefit from a reference support 11 that is particularly strong, compact, and functional, and that can be made in ways that are easily adapted to the various dimensions and formats of mirrors and to the various matrix arrangements of sensors, and that are easily machined, merely by drilling, in order to form the passages 16 that enable the rods 15 to pass through and reach the membrane 2.

In another variant embodiment, which can constitute an invention on its own, the reference support 11, and more particularly the multilayer structure 30, may incorporate certain electronic components, in particular passive components such as resistors or capacitors, that form part of the measurement and analysis circuit 34 and that are useful in processing the signals from the sensors, which components may for example be made by conductive or semiconductor deposits on the (top or bottom surface), or even in the embedded layers of said reference support 11.

In other words, the reference support 11, advantageously constituting a single part, may advantageously form a genuine on-board electronics card of the multi-chip module (MCM) type that enables measurement signals representative of the shape of the reflecting surface to be acquired and processed, at least in part.

Where appropriate, the signals from the sensors may be multiplexed, possibly by miniature electronics included in the box 5, or indeed on the reference support 11, so as to reduce the complexity and the expense of the processing electronics of the measurement circuit 34.

Furthermore, in applications that do not require the controlling setpoints of the actuators to be modified fast, the measurements from the various sensors may be filtered, averaged, or slowed down in order to improve the signal-to-noise ratio.

Furthermore, according to a preferred characteristic that can likewise constitute an invention on its own, regardless of the arrangement of the reference support 11 and/or the configuration of the sensors 14 relative to the actuators 16, the reference support 11 may include an electrically conductive guard line 60, as shown in FIG. 6, that is for connecting to ground so as to form an array of partitions separating the sensors 14 from the actuators 6, and separating the sensors 14 from one another, so as to limit capacitance variation or coupling phenomena that might disturb the operation of said sensors 14.

Said guard line 60 may advantageously be in the form of an array of conductive strips following sinuous paths on the surface of the support between the actuators, the passages 16, and the plates 21, preferably so as to form cells, and in particular square or rhombic cells, around each of them.

Furthermore, according to another preferred characteristic that can likewise constitute an invention on its own, regardless of the arrangement of the reference support 11 and/or the configuration of the sensors 14 relative to the actuators 16, the reference support 11 may include one or more reference sensors 40 situated facing a non-movable or substantially non-movable portion 2A of the reflector member 2, preferably at its periphery, so as to deliver a reference signal that corresponds to zero deformation of said reflector member 2, and thus of the reflecting surface 3.

In other words, said reference sensor 40 delivers a signal that corresponds to evaluating a predetermined fixed distance that is substantially non-varying between the hidden face 4 and the reference support 11, and more particularly the free top face thereof, which face preferably also carries the first plates 21 of some or all of the position sensors 14.

Advantageously, this reference signal serves to correct for drift, whether thermal or electronic, and also to correct for measurement noise affecting the useful (and varying) signals that are picked up dynamically by the position sensors 14 at moving points of the membrane 2 having positions that are servo-controlled.

In particularly preferred manner, said reference sensor 40 may be formed by a capacitive sensor, operating on the same principle as the position sensors 14 and making use of the same method of fabrication, the same method of cabling, and operating on the same principle.

In particularly preferred manner, the reference sensor 40 should also include a stationary first plate 41 secured to the surface of the reference support 11 and facing a likewise stationary second plate 42 that is preferably made integrally with the membrane 2.

Advantageously, the presence of such a reference sensor 40 improves the reliability of the mirror by making it easier to calibrate and by making it possible to correct any potential drift quickly and accurately.

The distance between the plates 41 and 42 of the reference sensor 40 is preferably substantially equal to the distance that should in theory lie between the first and second plates of the various position sensors 14 when at rest.

Furthermore, according to a preferred characteristic that can constitute an invention on its own, the measurement circuit 34 for picking up the signals from the terminals of the position sensor(s) 14, is preferably designed to be insensitive to the phase of the signals it picks up.

In other words, the value of the signal that is measured is preferably interpreted solely in terms of its amplitude.

For this purpose, it is possible advantageously to use a full-wave rectifier (or preferably two single-wave rectifiers on which the signals are superposed) in order to pick up and filter the AC signal from each sensor and observe the average magnitude of the rectified signal, which average magnitude depends solely on the peak magnitude of said signal and not on its phase.

Advantageously, such an arrangement makes it possible to ignore measurement errors even though the position sensors are powered by having an alternating voltage applied thereto between the membrane 2 itself forming a common plate 22, 42 and each of the first plates 21, 41, so that, on traveling along a radius of said membrane 2, a phase shift can be observed between the periphery and the center of the membrane as a result of the resistive losses of the conductive membrane (even though very small) and of the intermediate capacitive losses due to the various sensors 14 that are powered in succession.

Furthermore, with the mirror 1 advantageously housed in the box 5 that supports the membrane 2, which box also houses the actuators 6, said mirror may include cellular stiffness-distribution means 50 arranged between the bottom 5A of the box and the reference support 11.

Said stiffness-distribution means 50 preferably comprise a substantially rigid stiffener plate 51 pierced by clearance orifices 52 for passing the movable equipment 7 and a plurality of flexible suspension members 53 such as capsules closing the clearance orifices 52, each of said suspension members 53 connecting a piece of movable equipment 7 to the stiffener plate 51 so as to provide each piece of movable equipment 7 with suspension that is independent from that of the other pieces.

Advantageously, such an arrangement serves to split up deformation of the membrane 2 by partitioning the actuators in individual deformation cells that are mutually independent, and that are preferably of dimensions and in particular of transverse extent that are substantially identical.

More particularly, using stiffness-distribution means 50 in accordance with the invention makes it possible to have a reference that is rigid and substantially stationary, specifically formed by the solid portions of the stiffener plate 51, which plate is advantageously common to all of the actuators 6, the solid portions being situated between the various actuators 6 so that the free length of each cell, and more particularly of each suspension member 53, available for bending under the effect of the corresponding actuator 6 is relatively small, thereby increasing the overall stiffness of the device, and consequently increasing its resonant frequency and thus its passband.

Such an arrangement thus makes it possible to increase the frequency of servo-control, i.e. the frequency with which the mirror is "refreshed", and thus makes it possible to reduce the response time of the mirror considerably, while conserving excellent stability and good accuracy.

Preferably, and as shown in FIG. 5, the flexible suspension members 53 are formed as a single piece by a flexible film that covers one of the faces of the stiffener plate 51 and that is preferably intimately bonded thereto, e.g. by adhesive.

Furthermore, the fastening of each piece of movable equipment 7 to the suspension member 53 that corresponds thereto may be performed, e.g. by adhesive, either via the rod 15, or via the core 10.

In a particular variant embodiment that is not shown, the stiffener plate 51 may advantageously be separate both from the bottom 5A of the box (first level) and from the plate 20 forming the reference support 11 (second level), so as to constitute an intermediate third level inside the box that is independent of the other two levels.

The suspension members 53 may then be arranged on the top face of the stiffener plate 51, facing towards the membrane 2, while the magnetized cores 10 may Advantageously be placed either on the top faces of said suspension members, or else, and preferably, they may be housed in suspended manner within the thickness of said stiffener plate, inside the clearance orifices 52, and in contact with the bottom faces of the suspension members 53.

In another variant embodiment that is shown in FIG. 5, it is possible to envisage the suspension members 53 being arranged under the stiffener plate 51, i.e. facing the bottom of the box and under the clearance orifices 52, with the cores 10 then being suspended from said suspension members 53, underneath them.

In such a configuration, the stiffener plate 51 may optionally be in contact with or be formed integrally with the plate 20 that forms the intermediate reference support 11. Where appropriate, the clearance orifices 52 may form extensions to the passages 16, which passages would then present a stepped shape with a constriction shoulder at the transition between the clearance orifice 52 and the open top portion of the passage.

Advantageously, this configuration makes it possible to make the mirror more compact.

Naturally, one or other of the stages constituted by the bottom of the box, the stiffener plate 51, and/or the reference support 11 may advantageously be made up of separate elements that are assembled together, in particular by being stacked in reversible manner, thereby in particular facilitating assembly and maintenance, and in particular facilitating possible operations of replacing an actuator.

By way of non-limiting example, the mirror 1 in accordance with the invention may constitute a micro-mirror in which the actuator(s) 6 may possess a working stroke lying substantially in the range 1 μm to 20 μm or even 40 μm, with positioning accuracy and servo-control accuracy relative to a setpoint lying substantially in the range 1 nanometer (nm) to 10 nm, and in which the setpoint can be modified at a refresh frequency that lies substantially in the range 0.1 kilohertz (kHz) to 10 kHz.

By way of indication, said mirror 1 may in particular present the following dimensions:
- diameter of membrane 2: 5 mm to 30 mm;
- thickness of membrane: 5 μm to 30 μm;
- overall height from the membrane 2 to the bottom 5A of the box: 1 mm to 7 mm;
- number of actuators 6: in the range 1 to 500, preferably in the range 20 to 100;
- number of position sensors 14: in the range 1 to 500, preferably in the range 20 to 100;
- linear spacing between two adjacent actuators 6, and more particularly between two adjacent pieces of movable equipment 7: 1 mm to 3 mm;
- diameter of the rod 15 (width $L_{15}$): 50 μm to 300 μm;
- radial transverse clearance in the passage 16 (half-width $L_{16}$): 100 μm to 500 μm;
- distance $R_{14}$ of the sensor 14 from the deformation path (XX') (half-width $L_{14}$): 50 μm to 300 μm;
- diameter of the core 10 (width $L_{10}$): 500 μm to 1000 μm;
- diameter of the coil (width $L_9$): 1000 μm to 1700 μm;
- thickness of the plate 20 forming the reference support 11: 1 mm to 3 mm; and
- thickness of the stiffener plate 51: 1 mm to 3 mm.

Naturally, the person skilled in the art is capable of adapting, combining, or isolating the various above-mentioned characteristics in order to adapt the mirror 1 of the invention to requirements.

The operation of a mirror in accordance with the invention is described briefly below with reference to the figures.

Initially, the mirror is at rest, the actuators 6 being released and the mean profile $P_0$ being regular.

When it is necessary to correct the wavefront of an electromagnetic beam that strikes the reflecting surface 2 and that is reflected thereon, the servo-control device of the mirror activates the activation members 9 of the actuator(s) 6 concerned in such a manner as to force vertical movement, in downward traction or in upward compression, of the corresponding piece(s) of movable equipment 7, thereby deforming the reflecting surface 3 in selected manner and substantially independently in register with each actuator 6, so as to modify the optical path length followed by each ray.

When the core 10 is attracted, or on the contrary repelled, by the activation member 9, it moves the rod 15 and consequently the membrane 2 via its hidden face to which the rod 15 is adhesively bonded.

This movement of the movable equipment 7 takes place simultaneously relative to the frame of reference constituted by the box 5 and relative to the reference support 11 secured to said box.

As a result, the membrane 2, and more particularly its hidden face 4, moves towards or on the contrary away from the reference support 11, and more particularly its top face on which the first plates 21 are arranged.

This has the effect of modifying and more particularly of reducing or conversely of increasing the distance between the first plate 21 and the second plate 22 of the or each position sensor 14 situated in association with the actuators 6 that have been activated.

This modification of capacitance can be measured by applying an alternative voltage to the terminals of said sensors 14, and more particularly by injecting said voltage via the membrane forming the common second plate 22, 42, with the corresponding signals being picked up from each of the sensors via its first plate 21, via a distinct respective track 36.

Furthermore, although the membrane 2 deforms in register with the actuators 6 in operation, it nevertheless remains at a fixed distance from the first electrode 41 of the reference sensor 40, which electrode delivers a reference signal relative to which it is possible to compare and/or normalize the signals received from the various variable sensors 14 in order to provide dynamic correction for any drift in the measurement circuit.

Advantageously, the rod 15 of the movable equipment continues to move through the reference support 11 until the corresponding sensor 14 indicates that the position corresponding to the servo-control setpoint has been reached.

The signals delivered by the sensors are read and the position setpoints for the sensors are adjusted together with actually performing the corresponding movement, on a periodic basis at a refresh frequency that may be particularly high, and in particular that may be of the order of 100 hertz (Hz) to 10,000 Hz.

The response time of the actuators, and more particularly of the membrane 2 and of the mirror, may advantageously be of the order of 0.1 milliseconds (ms) to 10 ms.

Nevertheless, the mirror 1 of the invention is also perfectly suitable for applications in which it is desired to maintain the mirror lastingly in a stable configuration corresponding to a selected profile, in which case it is possible to lower the refresh frequency significantly, e.g. to 1 Hz or less, thereby making it correspondingly possible to improve the signal-to-noise ratio of the measurements, and thus the stability of the reflector member 2.

Where necessary, once the desired position has been reached, each piece of movable equipment 7 may advantageously be held in position for the necessary length of time over a plurality of periods, with drift, if any, being detectable by means of the reference sensor and being compensated immediately.

The reflecting surface of the membrane 2 may thus present appearance that is curved, smooth, corrugated, or embossed, as shown in FIG. 4, with its variable profile advantageously being defined and controlled both locally and overall in dynamic manner.

Thus, the invention makes it possible to make a deformable mirror 1 that is particularly accurate and reactive, and that can equally well be of small or larger dimensions, but that advantageously presents a structure that is compact and relatively simple by having its on-board sensors incorporated within the box under the membrane and so to speak interleaved with the actuators, the structure consequently being relatively easy to assemble and inexpensive to produce.

Advantageously, incorporating a set of sensors of the invention makes the mirror completely independent since its operation and more particularly its deformation may be servo-controlled in a manner that is particularly fine without requiring the presence of any additional external optical monitoring equipment.

Furthermore, in spite of its large dynamic range, the present invention also makes relatively large amplitudes of deformation available by proposing actuators with a relatively large working stroke, while nevertheless avoiding phenomena of mechanical resonance and while conserving accuracy that may be very great indeed, being of nanometer order, and that is guaranteed by a measurement system that is particularly sensitive and accurate, and that is affected very little by potential thermal, mechanical, or electromagnetic disturbances.

In particular, the invention makes it possible to benefit from a spatial concentration of numerous sensors and actuators that are overdimensioned relative to the space available, and in particular the overall width of the mirror.

Furthermore, no actuator element constitutes a screen for the sensors, with the sensors advantageously being arranged very close to the membrane, i.e. being spaced apart therefrom by a very narrow gap, preferably forming a thin sheet of air, and thus making it possible in real time to obtain a signal that is faithfully representative of the deformations of the membrane, of good quality, and that presents a good signal-to-noise ratio.

The invention thus makes it possible to approach the sensors to the deformed zone both vertically and horizontally, while the actuators can be arranged relative to one another in a manner that is practically contiguous, edge to edge, without the installation of the actuators being hindered by the presence of said sensors.

In addition, the performance of the mirror in accordance with the invention is advantageously long-lasting and reproducible insofar as said mirror can be recalibrated easily and automatically in order to compensate for phenomena of drift, in particular of thermal drift and of electronic drift.

Such a mirror thus presents excellent reliability and a long lifetime while simplifying any maintenance operations that might be required.

SUSCEPTIBILITY OF INDUSTRIAL APPLICATION

The industrial application of the invention lies in the design, fabrication, and utilization of deformable mirrors.

The invention claimed is:

1. A deformable mirror (1) comprising firstly a deformable reflector member (2) that possesses a reflecting surface (3) and secondly at least one actuator (6) suitable for driving said reflector member (2) in movement substantially along a deformation direction (XX') so as to be capable of deforming the reflecting surface (3), said mirror being characterized in that the actuator (6) presents a cross-section (S6) of variable width along said deformation direction (XX'), and in that it includes at least one interstitial position sensor (14) that is arranged in the interstitial space (12) lying between the reflecting surface (3) and the largest cross-section ($S6_{MAX}$) of the actuator (6), on an intermediate reference support (11) relative to which the reflector member (2) moves when it is driven by said actuator, so as to be able to evaluate the position and/or the movement of said reflecting surface (3) relative to said reference support (11), said sensor (14) occupying a cross-section (S14) transversely to the deformation direction that, in projection along said deformation direction (XX'), presents at least one overlap zone (SR) with the largest cross-section of the actuator ($S6_{MAX}$).

2. A mirror according to claim 1, characterized in that the actuator (6) comprises a piece of movable equipment (7) that includes a drive core (10) such as a permanent magnet, which core is connected to the reflector member (2) by a spacer (15) of the rod kind, which spacer presents an overall width ($L_{15}$) that is smaller than the overall width ($L_{10}$) of said core (10) so as to form a constriction (13) in a passage (16) formed through the reference support (11), said passage (16) itself being wider than the spacer (15) and narrower than the core (10), such that the position sensor (14) carried on the reference support in the vicinity of the passage (16) is situated at least in part over said core (10).

3. A mirror according to claim 1, characterized in that the position sensor (14) is capacitive and comprises a first plate (21) arranged on the intermediate support facing the reflector member (2) and a second plate (22) fastened to said reflector member (2) substantially over the first plate.

4. A mirror according to claim 3, characterized in that the first plate(s) (21) is/are formed by one or more substantially plane electrodes arranged on the free surface of the reference support (11) directly facing the reflector member (2).

5. A mirror according to claim 3, characterized in that the second plate (22) is formed by the reflector member (2) itself.

6. A mirror according to claim 1, characterized in that it includes a plurality of actuators (6) together with a plurality of position sensors (14) that are carried by a common reference support (11).

7. A mirror according to claim 1, characterized in that it includes a plurality of actuators (6) and a plurality of position sensors (14), the position sensors being arranged in a configuration that is staggered relative to the actuators (6).

8. A mirror according to claim 6, characterized in that the reference support (11) includes an electrically conductive guard line (60) for connecting to ground and that forms an array of partitions separating the sensors (14) from the actuators (6), and also separating the sensors (14) from one another, so as to limit coupling phenomena that might disturb the operation of said sensors (14).

9. A mirror according to claim 1, characterized in that the reference support (11) is formed by a plane and substantially rigid plate (20) that is pierced by one or more through passages (16) enabling the movable equipment (7) of the actuator(s) (6) to pass through the plate.

10. A mirror according to claim 1, characterized in that cabling elements (36, 37) for connecting the sensor(s) (14) to a remote measurement circuit (34) are housed in the interstitial space (12).

11. A mirror according to claim 1, characterized in that the reference support (11) presents a multilayer structure (30) comprising at least one layer of conductive cabling in which a plurality of separate cabling tracks (36) are formed, which tracks are connected to the sensors (14).

12. A mirror according to claim 1, characterized in that the reference support (11) presents a multilayer structure (30) that possesses a first electrically conductive protection screen (31) facing towards the reflector member (2) and a second electrically conductive protection screen (32) remote from the first and facing in the opposite direction, such that said screens (31, 32) define between them a tunnel (33) that is protected by electromagnetic shielding and that receives some or all of the cabling of the position sensor(s) (14).

13. A mirror according to claim 11, characterized in that the multilayer structure (30) is covered on its side situated towards the reflector member (2) in an electrically insulating layer (35) having one or more plane conductive pads arranged on its free surface to form capacitor plates (21) for the sensor(s) (14).

14. A mirror according to claim 11, characterized in that the reference support (11) is formed by a printed circuit card.

15. A mirror according to claim 1, characterized in that the reference support (11) incorporates certain electronic components that are useful in processing signals from the sensors (14).

16. A mirror according to claim 1, characterized in that the signals from the sensors (14) are multiplexed.

17. A mirror according to claim 1, characterized in that the reference support (11) includes a reference sensor (40) that is situated in register with a non-movable portion (2A) of the reflector member (2), preferably at its periphery, so as to deliver a reference signal corresponding to zero deformation of the reflecting surface (3).

18. A mirror according to claim 1, characterized in that it includes actuators (6) in a first array and position sensors (14) in a second array presenting spatial density, shape, and/or pitch that is/are different from the spatial density, shape, and/or pitch of the array of actuators (6).

19. A mirror according to claim 1, characterized in that it includes a measurement circuit (34) for picking up the signals from the terminals of the position sensors (14), said measurement circuit being insensitive to the phase of the signals it picks up.

20. A mirror according to claim 1, characterized in that it is housed in a box (5) that supports the reflector member (2) and within which there are housed the actuators (6), said mirror including cellular stiffness distribution means (50) arranged between the bottom of the box and the reference support, said stiffness distribution means comprising a substantially rigid stiffener plate (51) that is pierced by clearance orifices (52) suitable for passing the movable equipment (7) of the actuators, and a plurality of flexible suspension members (53), such as capsules closing the clearance orifices (52), which members connect each piece of movable equipment (7) to the stiffener plate (51) in order to provide each piece of movable equipment with independent suspension.

21. A mirror according to claim 1, characterized in that it constitutes a micro-mirror in which the actuator(s) (6) is/are suitable for deforming the reflecting surface (3) both forwards and backwards relative to its neutral rest profile ($P_0$), over a working stroke that lies substantially in the range 10 μm to 20 μm or even 40 μm, with accuracy that lies substantially in the range 1 nm to 10 nm, and with a position setpoint that can be modified at a refresh frequency that lies substantially in the range 100 Hz to 10 kHz.

22. A mirror according to claim 1, characterized in that the reflector member (2) is formed by a flexible membrane.

23. A mirror according to claim 1, characterized in that it constitutes an adaptive deformable mirror.

24. A mirror according to claim 1, characterized in that said reference support (11) provides a stable reference point.

25. A mirror according to claim 1, characterized in that said reflector member (2) is mounted on a main support (5) in such a manner as to be attached to said main support (5) solely at its periphery.

26. A mirror according to claim 1, characterized in that said actuator (6) is designed to move relative to said reference support (11).

27. A mirror according to claim 1, characterized in that said actuator (6) is secured to a support (5A) that is arranged under the reference support (11) and at a distance therefrom in such a manner that said reference support (11) is interposed between said reflector member (2) and said support (5A).

* * * * *